Dec. 14, 1943.                L. R. SCHUESSLER                2,336,572
                        RECORD CARD FILING SYSTEM
                           Filed Jan. 14, 1942              2 Sheets-Sheet 1
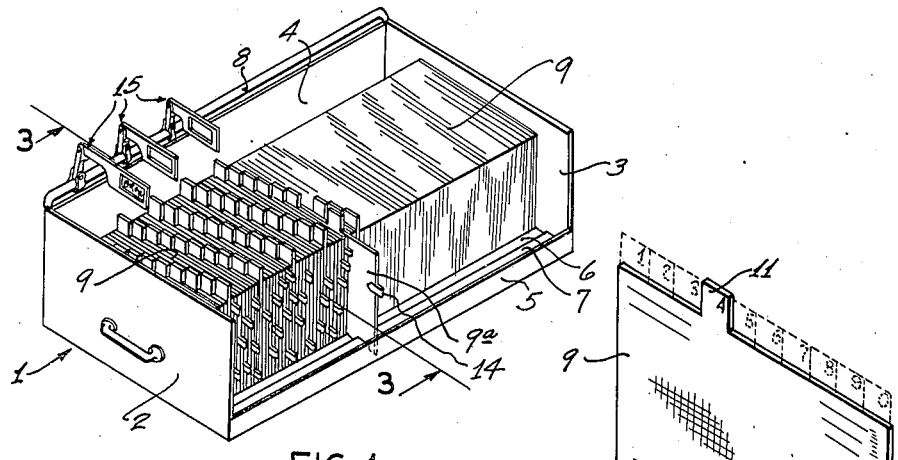
FIG.1.
FIG.2.
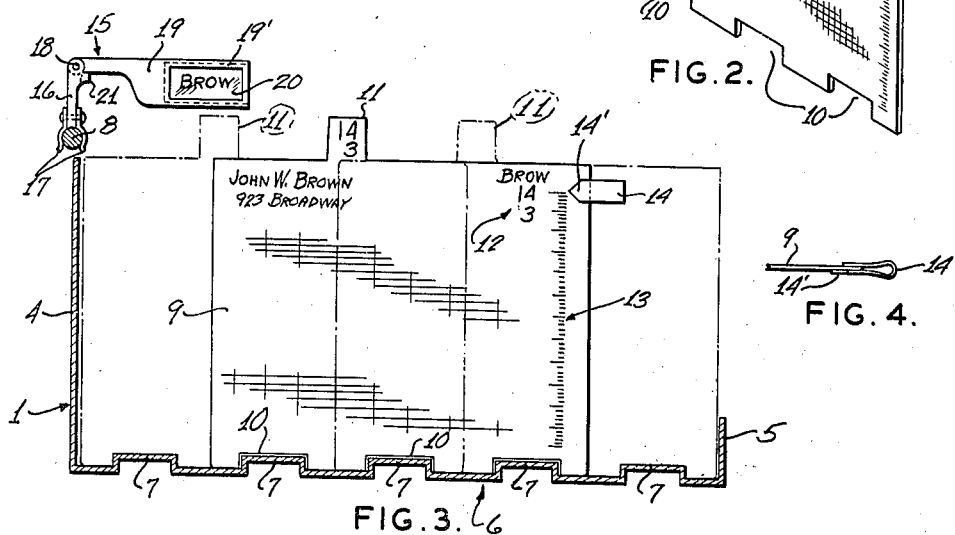
FIG.3.
FIG.4.
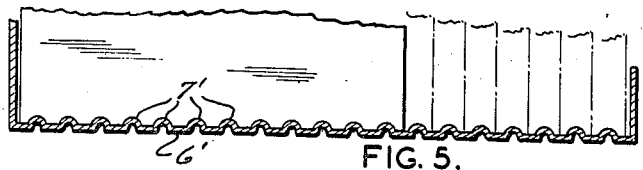
FIG.5.
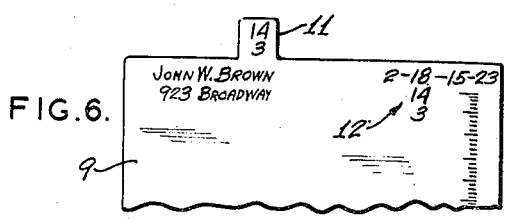
FIG.6.
INVENTOR.
LEVYN RAY SCHUESSLER
BY
ATTORNEY Dec. 14, 1943.                L. R. SCHUESSLER                2,336,572
                         RECORD CARD FILING SYSTEM
                          Filed Jan. 14, 1942           2 Sheets-Sheet 2

INVENTOR.
LEVYN RAY SCHUESSLER
BY
ATTORNEY

Patented Dec. 14, 1943

2,336,572

UNITED STATES PATENT OFFICE 2,336,572

RECORD CARD FILING SYSTEM

Levyn Ray Schuessler, St. Louis, Mo.

Application January 14, 1942, Serial No. 426,663

8 Claims. (Cl. 129—16)

This invention relates generally to record filing systems and more specifically to an improved record card filing system, the predominant object of the invention being to provide an improved record card filing system which is of such improved and unique arrangement that a filed record card of a particular person, which it is desired to consult, may be located in much less time than is possible in the use of record card filing systems heretofore known.

Another important object of the invention is to provide record cards which are of such improved construction and arrangement that the purposes of the invention may be carried out, and which, additionally, include in association therewith adjustable means which serve to indicate the number or volume of business transactions the person to whom a particular record card relates has had with a business establishment employing the improved record card filing system.

Still another important object of the invention is the provision of an improved record card filing receptacle which includes means with which portions of the filed record cards cooperate so as to provide for the shifting of record cards laterally of the filing receptacle in order to move certain record cards to offset positions with respect to others of the filed record cards.

Yet another important object of the invention is to provide the filing receptacle with improved indexing means which designate and indicate different subdivisions of the assembled, filed record cards.

In large business establishments, for instance, retail department stores, it is essential that very complete records be kept which will definitely identify each customer who maintains a charge account with the store, to the end that it would be difficult for an unauthorized person to make purchases of goods which would be charged to the account of a customer. It is also essential that the record system of the store be of such nature that when a customer makes a charge purchase and the sales slip is sent to the department of records for approval of the purchase, there will be no annoying delay incident to the location of the customer's records and the approval of the purchase.

The main purposes of the present invention, therefore, are to provide an improved card filing system which answers the requirements pointed out above, in that a record card of a customer will positively identify the customer so that the likelihood that unauthorized purchases may be charged to the customer's account is reduced to a minimum, and which is of such character that a record card of a customer may be located with the least expense of time and labor in order that approval of an authorized purchase may be given without subjecting the customer to annoying delay.

Fig. 1 is a perspective of the improved record card filing receptacle of the present invention with the record cards assembled therein.

Fig. 2 is a perspective of one of the record cards.

Fig. 3 is an enlarged, cross-section taken on line 3—3 of Fig. 1.

Fig. 4 is a fragmentary plan view of one of the record cards showing the adjustable transaction indicating means associated therewith.

Fig. 5 is a fragmentary cross-section showing the lower portion of a slightly modified form of the record card receptacle.

Fig. 6 is a fragmentary elevation of one of the record cards and indicating a different manner of identifying a customer.

Figure 7:
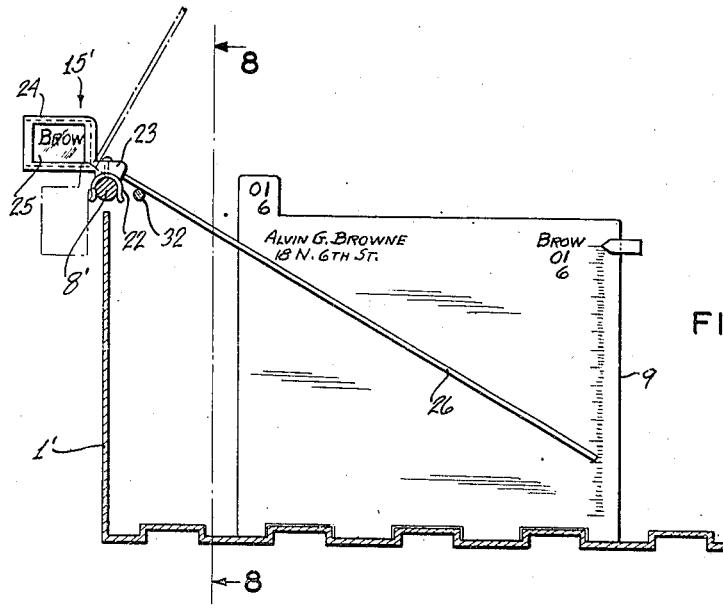
Fig. 7 is a cross-section similar to Fig. 3 but illustrating a different type of indexing means.

In the drawings, wherein are shown for the purpose of illustration, merely, several embodiments of the invention, 1 designates in Figs. 1 and 3 a card filing receptacle. The receptacle 1 includes a solid front wall 2, a rear wall 3, a side wall 4 which is of approximately the same height as the front and rear walls, a side wall 5 at the opposite side of the receptacle to the wall 4 which is of substantially less height than the full-height wall 4, and a bottom wall 6. The bottom wall 6 of the receptacle 1 is provided with a plurality of upstanding, rib-like extensions 7 which are spaced transversely of the bottom wall 6 and are extended longitudinally of said bottom wall, said extensions being shown in Fig. 3 as being of substantially rectangular formation in cross-section. The card filing receptacle 1 includes also a rod 8 which is supported at its opposite ends immediately above the upper edge of the wall 4 and in upwardly spaced relation with respect to said upper edge of said wall, the rod 8 being extended longitudinally of the upper edge of the wall 4 as shown to the best advantage in Fig. 1.

The record cards 9, which form parts of the invention, are formed as shown to the best advantage in Fig. 2; that is to say, the lower edge portion of each record card is provided with a plurality of cutout portions 10 which are spaced apart in accordance with the spacing of the extensions 7 of the bottom wall 6 of the card filing receptacle 1, and the cutouts 10 of the cards 9 are shaped in accordance with said extensions 7. As shown in Figs. 1 and 3, the cards 9 are of less width than the width of the card filing receptacle 1 and therefore the cards may be disposed within the card receptacle 1 so that the left-hand edges of said cards are located immediately adjacent to the inner face of the wall 4 of the receptacle, in which position of the cards certain of the extensions 7 of the bottom wall of the receptacle will project into the cutouts 10 of the cards. Also if it is desired to offset certain cards laterally of the card indexing receptacle 1 so that they project beyond the remainder of the cards contained in the receptacle 1, at the open side thereof, the cards to be shifted are raised until their cutout portions 10 clear the extensions 7 of the bottom wall of the receptacle and are shifted laterally, said cards then being lowered to positions where their cutout portions 10 again engage certain of the extensions 7 at the bottom wall of the receptacle. A card which has been shifted as described above is shown in Fig. 1 wherein it is designated by the reference character 9a.

Each record card of the group of cards contained within the indexing receptacle 1 is provided with a tab 11 which extends upwardly beyond the top edge of the card. The tab of a record card may occupy any one of ten positions spaced longitudinally of the record card, as shown in Fig. 2, wherein the tab 11 is shown by full lines in one position and the other nine positions which may be occupied by tabs of cards are shown by dotted lines. The position of the tab of any one record card is determined by the matter printed or written on the card which identifies the person to whose account the card relates. In other words, a person opening, or having, an account with the business establishment employing the improved filing system, will select a key number for his account, for instance, such person may select as this key number the numeral designation of the year of his birth, or of any other year which he will be likely to remember without difficulty. The last numeral of the selected key number determines the position of the tab 11 at the top of the customer's record card; in other words, if the customer selects as his key number "1891," the year of his birth, the tab 11 of his card will be in the first position at the left-hand side of the record card. Likewise if the selected key number of a customer is "1912," the tab 11 of his record card will be in the second position at the left-hand side of the card, and if the key number of a customer is "1923" the tab 11 of his record card will be in the third position from the left-hand side of the card. This system is followed throughout all of the different positions of the tabs of the record cards, the last numeral of the selected key number determining the position of the tab of the customer's record card, with the result that the tab 11 of the record card of a customer whose key number is "1900" will be located in the last tab position adjacent to the right-hand side of the card.

Obviously, the use of the year of birth of a customer as his key number is suggested only to make it less likely that he will forget his key number, and if a customer feels that he will be able to remember his key number without having it related to his birth, or to some other event of his life, he may select any number he desires for his key number. Also, as has been stated above, when numerals designating a year are used by a customer as a key number, only the last numeral of such year designation is considered in determining the location of the tab 11 of the customer's record card. However, in order to more definitely identify the customer to whose account a record card relates, the last two numerals of the key number is applied to the tab 11 of the record card and to the body of the record card, as shown in Fig. 3. In addition to the appearance of the key number, or a part thereof, on the tab 11 of each record card, the name and address of the customer to whose account the record card relates also appears on the body of the record card. Likewise, for purposes incident to filing and indexing of the record card the first four letters of the customer's name appear at the upper right-hand corner of the record card, and immediately beneath those first four letters of the customer's name the customer's key number, or a portion thereof, which is applied to the tab 11 of the record card, as shown at 12 in Fig. 3. Additionally, the store account number should be applied beneath the key number as shown at 12 in Fig. 3, this account number being the numeral "3" in Fig. 3. The use of the store account number gives complete flexibility of numbering of the record cards and in obtaining positive identification of customers.

As a means of recording the volume of purchases or the number of times a customer has made purchases in a store employing the improved record filing system during a determined period of time, each record card may be provided at a point adjacent to the right hand edge of the card with a vertical row of spaced marks 13. Also, movably supported by the right-hand edge portion of each record card is a vertically slidable indicator 14 which frictionally grips the card and is provided with a pointed indicating portion 14'. The indicator 14 may be formed from any suitable resilient material shaped to provide a substantially U-shaped indicator, the legs of which frictionally grip the edge portion of the record card so that indicator may be moved with respect to the card and will remain in any position to which it is adjusted. It is obvious that the indicator 14 of a customer's record card may be adjusted downwardly to the next lower mark of the row of marks 13 each time the customer makes a purchase, and therefore the store will have a quick reference record of the number or volume of purchases made by the customer during a designated period. This is important where the store management desires to be quickly informed as to the activity of a customer's account.

Supported by the rod 3 is a plurality of indexing members 15 which are suitably positioned to indicate sections or sub-divisions of the entire group of record cards contained within the card filing receptacle 1. When the record cards are filed alphabetically, as would be the record card illustrated in Fig. 3 which bears at its upper right-hand corner the first four letters of the customer's name, the associated indexing member 15 has suitably displayed thereon appropriate alphabetical symbols which relate the indexing member to the section of record cards with which the indexing member 15 is associated for indexing purposes. In other words, the indexing member 15 associated with the section of the filed record cards in which the record card 9 shown in Fig. 3 is included, would have displayed thereon the symbol "Brow," and the record cards of all customers having names the first four letters of which correspond with the four letters of the symbol on the associated indexing member would be filed in the section of record cards designated by that particular indexing member.

Each indexing member comprises a vertical bar 16 to which is attached at its lower end a pair of spring clips 17 which are adapted to frictionally engage the rod 8 so as to secure the indexing member in a fixed position on said rod 8. Secured to the upper end portion of the vertical bar 16 by means of a pivot element 18 is a pivotally movable arm 19 which is provided with suitable means 19' adapted to receive an element 20 on which the appropriate indexing symbol is displayed. The bar 16 is provided with an abutment 21 which serves to retain the arm 19 horizontally when it is in its effective indexing position where it overhangs the filed record cards, and said arm may be swung upwardly and outwardly about its pivot 18 when it is desired to withdraw or consult a filed record card over which the arm of the indexing member hangs. Obviously, the various indexing members 15 may be fixedly clipped to the rod 8 at any points where they are required.

In the use of the improved filing system the employment of the key number greatly reduces the time required to locate a record card which it is desired to consult. In other words it will be assumed that a clerk desires to consult the record card of "John W. Brown" shown in Fig. 3, and that the sales slip which came to the clerk showed that the customer's key number was "14." The clerk would find the section of filed record cards designated by the symbol "Brow" and would locate the tabs in that section of record cards which are in the fourth tab position, and in this group of relatively few record cards he could very quickly find the desired card. In some cases the desired record card might be the only card in the section having its tab 11 located in a particular tab position, while in other cases there may be a number of record cards whose tabs 11 are located in the particular tab position, but even in the latter event the desired card could be located in much less time than if the clerk would be compelled to search through the entire section of filed cards marked by a particular indexing member 15 for a desired card as was usually the case heretofore.

From the foregoing it is plain that the arrangement of providing the record cards with tabs that are located in different positions in accordance with key numbers related to the accounts of the customers, serves to divide the various general divisions of the filed record cards into subdivisions that include relatively few record cards, and as a result a desired record card may be located at a very considerable saving of time and labor. Also, if for any reason it is desired to separate a certain record card from the remainder of the filed record cards this may be accomplished by shifting the desired card laterally of the filing receptacle 1, as has been previously explained herein, to offset said card with respect to the other cards. Additionally, as has also been heretofore explained herein, the indicators 14 mounted at the right hand sides of the record cards may be adjusted to indicate the number of purchases made by customers during predetermined periods of time. It is to be noted also that because a purchaser must know the key number of an account before he may charge purchases to the account there will be less likelihood that unauthorized purchases will be charged to accounts.

In Fig. 6 a record card 9 is shown which is provided with a tab 11 and is otherwise arranged in accordance with the record card shown in Fig. 3 except that the customer's name is indicated numerically at 12' instead of alphabetically as in Fig. 3. In other words, instead of displaying on the record card for filing purposes the first four letters of the customer's name, as in Fig. 3, numerals indicating the numerical positions in the alphabet of those four letters are displayed on the card of Fig. 6 at the upper right-hand corner thereof. This record card may be employed in a case where it is desired to file records numerically instead of alphabetically and its use otherwise is the same as that already explained herein in connection with the record card shown in Fig. 3 which is intended for alphabetical filing.

In Fig. 5 a slightly modified form of the filing receptacle is illustrated, said receptacle of Fig. 5 differing from the filing receptacle of Fig. 3 in that upwardly projected extensions 7', corresponding to the extensions 7 of Fig. 3, are formed on the bottom wall 6' by numerous ribs of semi-circular shape in cross-section which are spaced transversely of the filing receptacle and extend longitudinally thereof.

Figure 8:
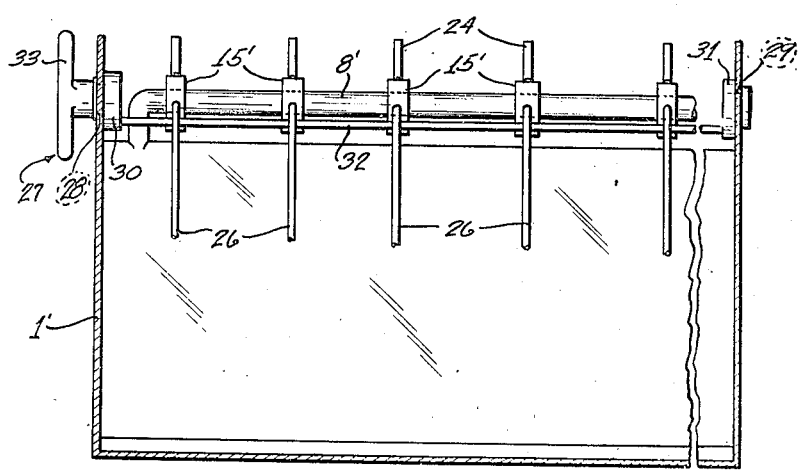
Fig. 8 is a fragmentary, vertical section taken on line 8—8 of Fig. 7.

In Figs. 7 and 8 a modified form of the indexing member 15 of Figs. 1 and 3 is illustrated. The indexing member 15' of Figs. 7 and 8 comprises an inverted U-shaped element 22 which fits loosely over the upper portion of a rod 8' so as to be supported thereby for rotary movement. The element 22 has secured thereto an arm 23 which supports a frame 24 that receives an element 25 on which is displayed the indexing symbol of the indexing member. Additionally the arm 23 has fixed thereto an elongated strip of material 26 which is disposed as a separator between the group of record cards making up the section of record cards marked by the indexing member, and an adjacent section of filed record cards.

In order to move the separators 26 of all of the indexing members 15' simultaneously out of their positions between adjacent sections of filed record cards when it is desired to adjust the record cards contained within the filing receptacle 1', a means 27 is provided. The means 27 comprises shafts 28 and 29 which are supported for rotation in openings formed in the front and rear walls of the filing receptacle 1' as shown in Fig. 8. The shafts 28 and 29 have fixed thereto flanges 30 and 31 which are disposed, respectively, at the inner faces of the front and rear walls of the filing receptacle, and fixed to and extended between the flanges 30 and 31 is an eccentrically arranged rod 32 which is disposed beneath the separators 26 of all of the indexing members 15'. The shaft 28 has fixed thereto a knob 33 which may be rotated in an anti-clockwise direction, when it is desired to raise the separators 26 of the indexing members 15', to cause the rod 32 to swing upwardly and outwardly in an arc of a circle in engagement with the lower faces of the separators 26 so as to move each of said separators from the full line separator position shown in Fig. 7 to the dotted line position of the separator shown in that view. When the separators 26 are raised as described the U-shaped elements 22 of the indexing members rotate about the rod 8'.

The account number which appears on each record card, this account number being the numeral "3" shown at the upper right-hand corner of Fig. 3, serves as an additional aid in identifying a record card of a particular customer when it is remembered by the customer. However, a customer's record card may be quickly located and identified without knowledge of this account number, as has been already explained herein, and in most cases the account number will have more importance as a part of the store management's records than as something to be remembered by the customer to aid in locating and identifying his record card. The importance of the account number will be realized when it is considered that in a section of the assembled record cards there may be a number of record cards identified by the same alphabetical symbol and the same key number, and in such a situation the account number will differentiate the similarly identified cards from each other. In other words, the record cards in each section of the assembled record cards which is designated by a certain alphabetical symbol are given account numbers running consecutively from "1" to the highest number required; that is to say the first record card in the "Brow" section of the assembled record cards will bear the account number "1" and the record cards following such first card will have applied thereto account numbers which run consecutively. Therefore, if six cards in the "Brow" section of the assembled record cards were identified by the same alphabetical symbol and the same key number, the account number would provide an additional means of identifying one particular card of the six similarly identified cards. This arrangement provides flexibility of the card identification system and serves as an additional means for detecting attempts of unauthorized persons to charge purchases to accounts of customers.

I claim:

1. A filing system including a group of record cards, means for maintaining said record cards in assembled relation, rotatably supported indexing members arranged out of engagement with respect to said assembled record cards and so related thereto as to indicate divisions of the assembled record cards, means for preventing said indexing members from moving into engagement with said assembled record cards, and tabs extended from said record cards and bearing key numbers, the tabs of various record cards being located in various positions on the cards which tab positions are determined by the key numbers appearing on the tabs of the record cards.

2. A record card filing assembly comprising a record card receiving receptacle, an assembly of record cards disposed within said receptacle, an indexing member for indicating divisions of said assembled record cards, said indexing member being supported out of engagement with said record cards for rotary movement with respect to said receptacle whereby it may be moved from its effective position to an ineffective position thereof, and means for preventing said indexing member from moving into engagement with any of said assembled record cards.

3. A record card filing assembly comprising a record card receiving receptacle, an assembly of record cards disposed within said receptacle, indexing means for indicating divisions of said assembled record cards, said indicating means comprising a rod supported by said receptacle, and an indicating member which is supported by said rod out of engagement with said record cards, said indicating member being adapted for rotary movement with respect to said receptacle whereby it may be moved from its effective position to an ineffective position thereof, and means for preventing said indexing member from moving into engagement with any of said assembled record cards.

4. A record card filing assembly comprising a record card receiving receptacle, an assembly of record cards disposed within said receptacle, and indicating means for indicating divisions of said assembled record cards, said indicating means comprising a rod supported by said receptacle, a plurality of indicating members which are supported by said rod for rotary movement with respect thereto, and means for simultaneously moving all of said indicating members from their effective positions to ineffective positions thereof.

5. A record card filing assembly comprising a record card receiving receptacle, an assembly of record cards disposed within said receptacle, and indicating means for indicating divisions of said assembled record cards, said indicating means comprising a rod supported by said receptacle, a plurality of indicating members which are supported by said rod for rotary movement with respect thereto, and rotary means for simultaneously moving all of said indicating members from their effective positions to ineffective positions thereof.

6. A record card filing assembly comprising a record card receiving receptacle, an assembly of record cards disposed within said receptacle, and indicating means for indicating divisions of said assembled record cards, said indicating means comprising a rod supported by said receptacle, a plurality of indicating members which are supported by said rod for rotary movement with respect thereto, and rotary means for simultaneously moving all of said indicating members from their effective positions to ineffective positions thereof, said rotary means including an element which engages beneath portions of all of said indicating members and which moves said indicating members from their effective to their ineffective positions on operation of said rotary means.

7. A file structure comprising a receptacle adapted to receive therein cards or other record-bearing elements arranged in substantially vertical positions and assembled in an elongated row, a plurality of indexing members having parts adapted for disposition with respect to the row of assembled record-bearing elements so as to indicate divisions of said row of record-bearing elements, and means for supporting said indexing members for individual adjustment longitudinally of the row of record-bearing elements, said indexing members including means providing for movement of said parts of said indexing members from operative positions where they are disposed with respect to the row of record-bearing elements so as to indicate divisions thereof to inoperative and non-indicating positions with respect to said row of record-bearing elements, and means for maintaining said parts of said indexing members out of contact with respect to said record-bearing elements when said parts of said indexing members are in their operative positions.

8. A file structure comprising a receptacle adapted to receive therein cards or other record-bearing elements arranged in substantially vertical positions and assembled in an elongated row, a plurality of indexing members having parts adapted for disposition with respect to the row of assembled record-bearing elements so as to indicate divisions thereof, and means for supporting said indexing members for individual adjustment longitudinally of the row of record-bearing elements, said indexing members including pivot means providing for movement of said parts of said indexing members from operative positions where they are disposed adjacent to the row of record-bearing elements so as to indicate divisions thereof to inoperative positions where they are located remote from said row of record-bearing elements, and means for maintaining said parts of said indexing members out of contact with respect to said record-bearing elements when said parts of said indexing members are in their operative positions.

LEVYN RAY SCHUESSLER.